US006108885A

United States Patent [19]

Cox

[11] Patent Number: 6,108,885

[45] Date of Patent: Aug. 29, 2000

[54] INSERTION TOOL

[75] Inventor: Norman Cox, Sheffield, United Kingdom

[73] Assignee: James Neill Holdings Limited, United Kingdom

[21] Appl. No.: 09/330,957

[22] Filed: Jun. 11, 1999

[30] Foreign Application Priority Data

Jun. 13, 1998 [GB] United Kingdom .................... 9812689

[51] Int. Cl.[7] ...................................................... B23P 19/04

[52] U.S. Cl. ................................................ 29/268; 29/270

[58] Field of Search .......................... 29/268, 270; 81/44, 81/418, 421, 422

*Primary Examiner*—David A. Scherbel
*Assistant Examiner*—Lee Wilson
*Attorney, Agent, or Firm*—Trexler, Bushnell, Giangiorgi & Blackstone, Ltd.

[57] ABSTRACT

The invention relates to insertion tools. Insertion tools are known to be used to secure a threaded insert to a plate-like member, to receive a threaded stem or stud of another component that needs to be attached to the plate-like member. The object of the invention is to allow a male threaded stud to be attached to a plate-like member. The objective is met by a tool that comprises a pair of handles pivotally attached to each, a drawbar in engagement with one handle to the opposite side of the pivot to the hand grip, the drawbar extending out of the other handle to lie within a guide tube attached to the said other handle, an extension tube attached to the support tube, an extension piece to the drawbar having a threaded end section at one end to engage a threaded hole in the end of a drawbar and having a threaded bore at the opposite end to receive a threaded stem intended to be attached on or in a support.

8 Claims, 3 Drawing Sheets

INSERTION TOOL

Figure 1:
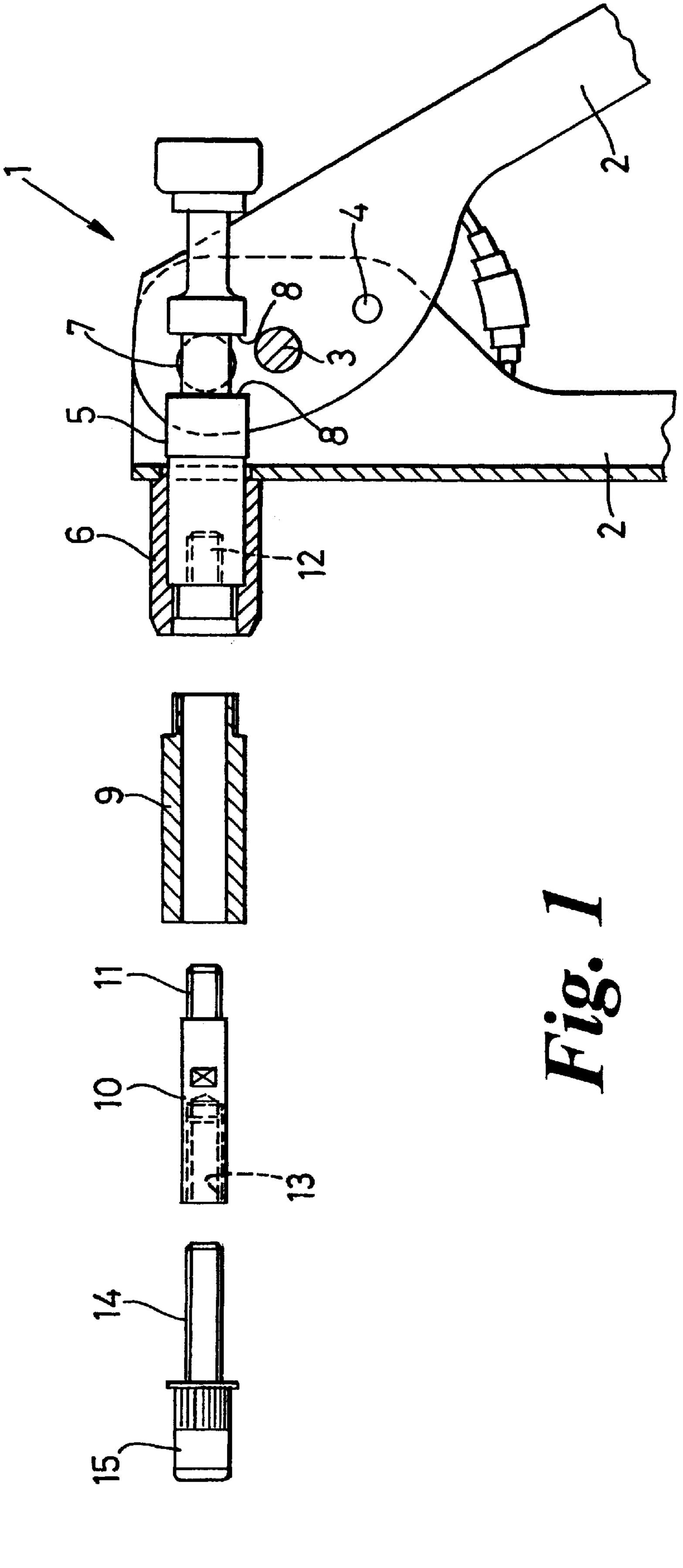

This invention relates to insertion tools.

There are numerous instances where an internally threaded insert needs to be located on a plate-like member or in a blind hole in a support member, to receive the threaded stem or stud of another component, or a bolt, and fixing tools for such threaded inserts are well known and in relatively widespread use.

In addition to the fixing of threaded inserts there is a growing need for the fixing to a plate-like member or in a blind hole in a support of a male threaded stud. Purpose built tools are available, but they are relatively expensive. It is possible that one plate-like member or support member may need to be provided with both female threaded inserts and male threaded studs, it has, hitherto, necessitated an operative being provided with two tools, one for each task.

The objective of the present invention is to provide a simple and relatively inexpensive tool for the attachment of a threaded stem or stud on or in a support member. A secondary objective is to provide a simple and relatively inexpensive means of converting a tool for the attachment of a threaded insert to a tool for the attachment of a threaded stem or stud, on or in a support.

According to the present invention, a tool for the attachment of a threaded stem on or in a support, comprises a pair of handles pivotally attached to each, a drawbar in engagement with one handle to the opposite side of the pivot to the hand grip, the drawbar extending out of the other handle to lie within a guide tube attached to the said other handle, an extension tube attached to the support tube, an extension piece to the drawbar having a threaded end section at one end to engage a threaded hole in the end of a drawbar and having a threaded bore at the opposite end to receive a threaded stem intended to be attached on or in a support.

Thus, a threaded stem on which is located an end cap or fastener sleeve is screwed into the extension piece to the drawbar until the end cap or sleeve butts against the end of extension tube located on the support tube, the handles of the tool being in the fully open position. Closing of the handles causes the drawbar and hence the extension piece to be drawn rearwardly through the extension tube and the guide tube. Consequently, the end cap or fastener sleeve is compressed against the end of the extension tube. Thus, with the end cap or fastener located in a hole on a support or through a hole in a plate-like member, compression of the end cap or fastener sleeve causes the end cap or fastener sleeve to lock in the hole, and increase the grip between the end cap or fastener sleeve and the threaded stem, to attach the threaded stem to the support in secure manner. With a plate-like support the end cap or fastener sleeve extends through a hole therein to position the end from which the threaded stem or stud emerges flush with the surface of the plate-like support. Alternatively, the end cap or sleeve is located in a blind hole in a support body with the end from which the threaded stem or stud emerges flush with the surface of the body. In both instances, the outcome is that a threaded stem or stud emerges directly from the surface of the plate or the support body.

Preferably, the handles of the tool are spring loaded to the open position, and further preferably an adjustable stop means is provided to limit the degree to which the handles can be closed, and hence the degree to which the drawbar and extension piece can be withdrawn, to control the degree to which the end cap or fastener can be compressed.

Still further preferably, the drawbar is of predetermined length and is rotatably mounted on the handles, to allow an adjustment of the position of extension piece within the extension tube, and whereby threaded stems or studs of different lengths can be accommodated.

Whilst the tool as defined above may be a dedicated tool for the purpose of attaching threaded stems or studs to a support, a major improvement over the prior art lies in the fact that the handles, drawbar and support tube can be common denominators in a tool for attaching a threaded stem and a tool for attaching a threaded insert to a support. As is discussed above, to enable the attachment of a threaded stem or stud on or in a support, there is provided an extension piece to the drawbar and an extension tube to the support tube. By removing the extension tube and the extension piece to the drawbar and replacing them by a rod threaded to opposite ends together with a shorter extension tube for attachment to the guide tube, the rod being attached to the end of the drawbar and having a threaded insert located on its exposed threaded end, it allows the tool to be used in known and conventional manner to secure a threaded insert on or in a hold in a support.

Figure 2:
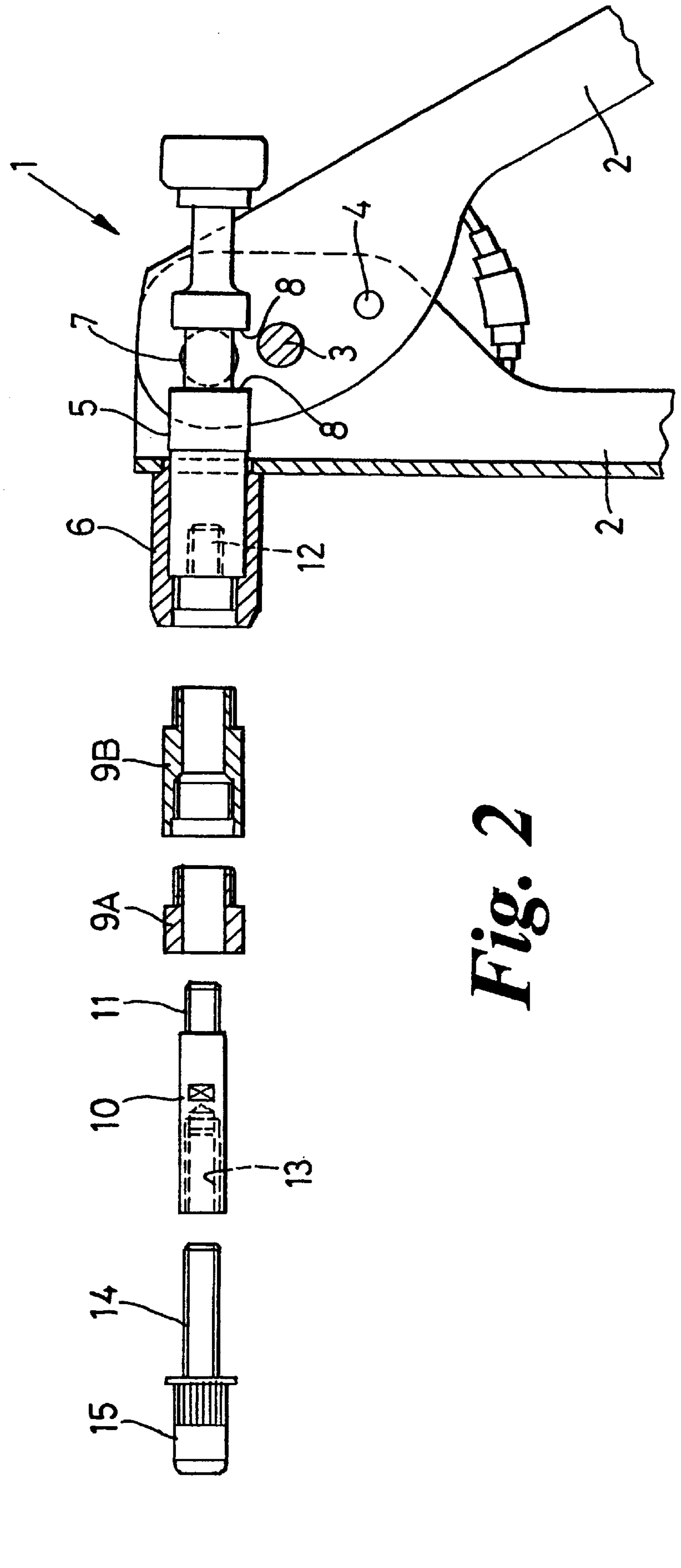
Figure 3:
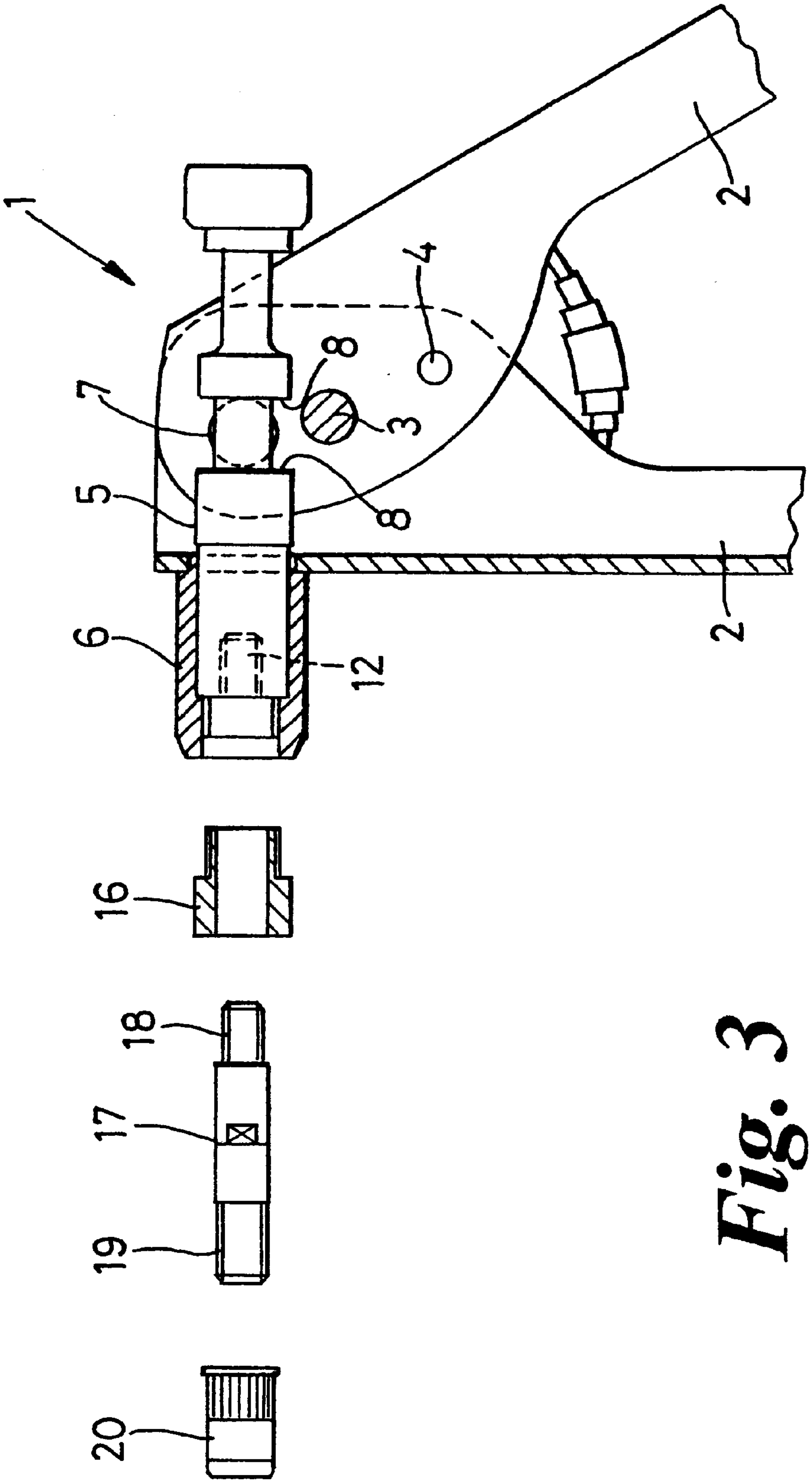

One embodiment of the invention is illustrated in the attached schematic drawings in which:

FIG. 1 is a part sectional side elevation of an insertion tool in accordance with the invention;

FIG. 2 corresponds to FIG. 1, but shows an alternative construction; and FIG. 3 corresponds to FIG. 1 but shows the tool converted for convention use.

In the drawings a tool 1 comprises a pair of handles 2 pivotally connected at 3, there being a mount 4 for a spring (not shown) to urge the handles to an open position. A drawbar 5 that extends through the handles and into a guide tube 6 attached externally to one of the handles. The other of the handles has a projection 7 to engage between shoulders 8 on the drawbar and whereby a closing of the handle withdraws the drawbar 5 along the guide tube 6.

As is illustrated in FIG. 1, and to enable the tool to secure a threaded stem or a stud to a support, an extension tube 9 is provided and attached to the guide tube 6 and there being an extension piece 10 for the drawbar having a threaded end section 11 to locate in a threaded bore 12 in the end of the drawbar 5. To the opposite end of the extension piece, is a threaded bore 13 to receive a threaded stem or stud 14 on which is located a blind cap 15.

With the tool assembled and the threaded stem or stud in place, the blind end cap 15 can be positioned through a hole in a plate or in a blind hole in a support body, and when closing of the handles causes the drawbar and the extension piece to retract to urge the end of the end cap against the end of the extension tube, to cause the cap to compress and hence lock against the sides of the hole in which it is located, to attach the threaded stem to a support in most secure manner.

As is illustrated in FIG. 2, and to enable the tool to accommodate threaded stems or studs 14 of different lengths, the extension tube 9 of FIG. 1 is replaced by an extension piece 9A to engage the guide tube 6, in turn engaged by a bush 9B to receive the threaded end section 11 of the extension piece 10. Here, the bush 9B can be replaced by bushes of different lengths to allow the accommodation of different lengths of stem or stud 14.

To convert the tool of the invention to serve the conventional purpose of attaching a threaded insert to a support, the tool insofar as those components 1 to 6 and 12 and concerned are retained, and the extension tube 9 and extension piece 10 removed. Thus, as is shown in FIG. 3 there is provided a shorter extension tube 16 for attachment to the guide tube 6, along with a rod 17 threaded at its two ends 18 and 19, the threaded end 18 engaging the threaded bore 12 on the drawbar 5 and a threaded insert 20 is positioned on the threaded end 19. With then the insert located through a hole in a support plate or in a blind hole in a support member, operation of the tool causes the compression of the threaded insert and its locking in its hole.

What is claimed is:

1. A tool for the attachment of a threaded stem on or in a support, comprising a pair of handles pivotally attached to each, a drawbar in engagement with one handle to the opposite side of a pivot to the hand grip, the drawbar extending out of the other handle to lie within a guide tube attached to the said other handle, an extension tube attached to a support tube, an extension piece to the drawbar having a threaded end section at one end to engage a threaded hole in the end of a drawbar and having a threaded bore at the opposite end to receive a threaded stem intended to be attached on or in a support.

2. A tool for the attachment of a threaded stem on or in a support as in claim 1, wherein the extension tube is a single member of predetermined length.

3. A tool for the attachment of a threaded stem on or in a support as in claim 1, wherein the extension tube is formed by an extension piece and a co-operating bush, the bush being replaceable by bushes of different lengths, whereby to accommodate different lengths of threaded stem.

4. A tool for the attachment of a threaded stem on or in a support as in claim 1, wherein the handles of the tool are spring loaded to an open position.

5. A tool for the attachment of a threaded stem on or in a support as in claim 1, wherein an adjustable stop means is provided to limit the degree to which the handles can be closed, and hence the degree to which the drawbar and extension piece can be withdrawn, to control the degree to which the end cap or fastener can be compressed.

6. A tool for the attachment of a threaded stem on or in a support as in claim 1, wherein the drawbar is of predetermined length and is rotatably mounted on the handles, to allow an adjustment of the position of extension piece within the extension tube, and whereby threaded stems or studs of different lengths can be accommodated.

7. A tool for the attachment of a threaded stem on or in a support as in claim 1, wherein the extension tube is formed by two components, an extension piece to engage the guide tube and a replaceable bush to receive the threaded end section of the extension piece, the length of bush being selected to suit the length of the threaded stem.

8. A tool for the attachment of a threaded stem on or in a support as in claim 1, and whereby to allow the tool to serve a conventional purpose the handles, drawbar and support tube are retained, and the extension tube and extension piece removed and replaced by a shorter extension tube attached to the guide tube, a rod, threaded at both ends extending through the extension tube to engage by one end a threaded bore on a drawbar, and to be engaged at the other end by a threaded insert.

* * * * *